United States Patent Office 3,130,427
Patented Apr. 28, 1964

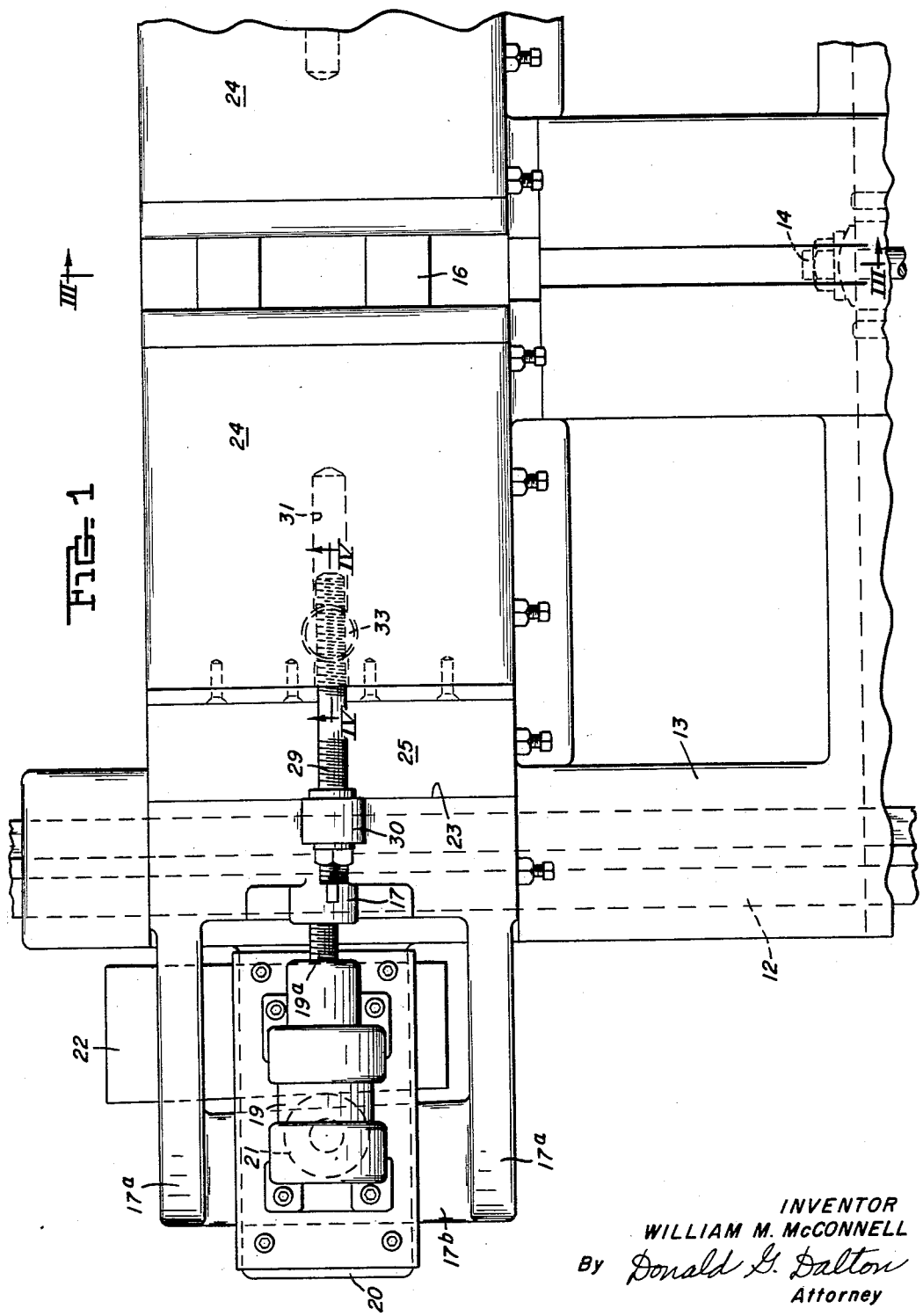

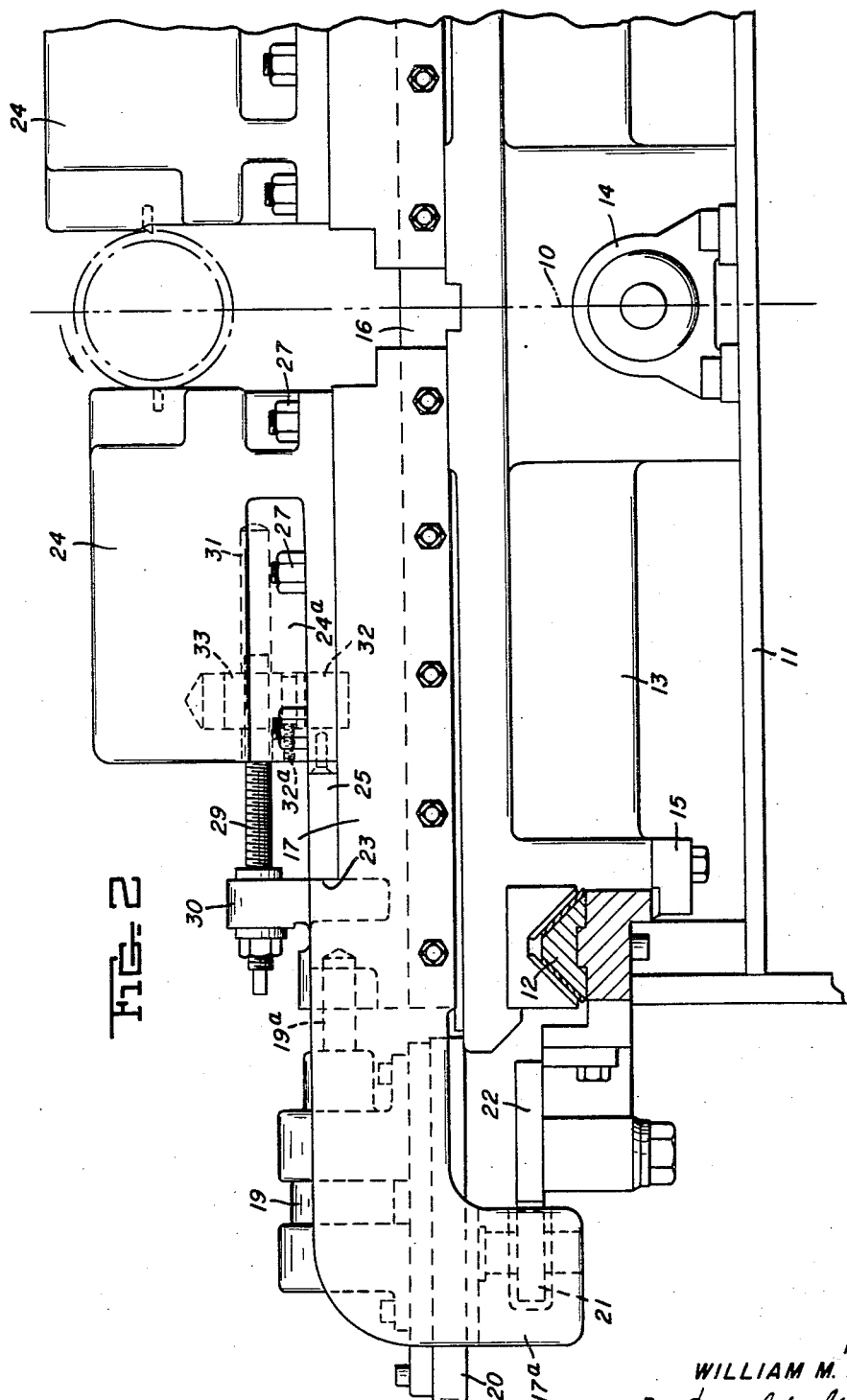

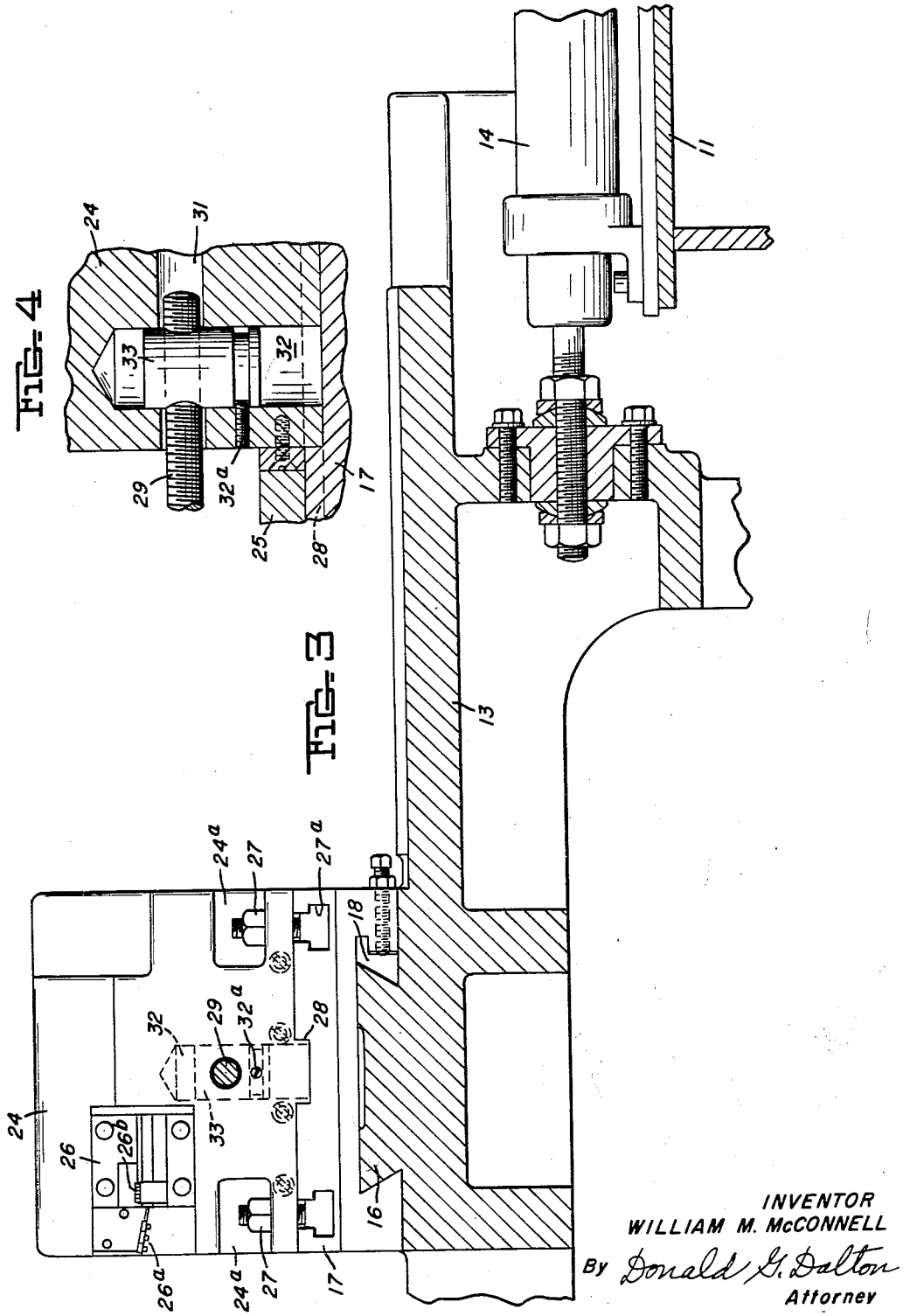

3,130,427
PIPE THREADING MACHINE WITH RIGID
TOOL CROSS SLIDE
William M. McConnell, Pittsburgh, Pa., assignor, by mesne assignments, to United States Steel Corporation, a corporation of New Jersey
Filed Feb. 6, 1961, Ser. No. 87,173
3 Claims. (Cl. 10—101)

This invention relates to pipe-threading machines and, in particular, to an improved machine adapted to use carbide thread-chasing tools and to operate at higher speed than such machines as known heretofore.

Pipe-threading machines have usually comprised means for chucking one end of a pipe length, rotating it and moving tool-steel thread chasers axially into engagement with it. When carbide chasers are substituted, in an attempt to make heavier cuts and operate at higher speed, considerable vibration develops which is destructive to carbide tools. It is accordingly the object of my invention to provide a threading machine affording a rigid mount for the thread chasers so as to eliminate vibration to a great extent while permitting the large movement necessary to adjust for different pipe sizes and the relatively slight movement to permit retraction of the chasers as a threading operation progresses toward completion.

In a preferred embodiment of the invention, I provide a saddle movable on a supporting frame in longitudinal ways parallel to the axis of a pipe length positioned ready for rotation to turn a thread at one end. The saddle is elongated transversely of the ways and has two spaced tool-holder slides movable therealong. A tool holder is mounted on each slide and a removable precision spacer block determines the exact position of each holder on the slide. A fluid-pressure cylinder on the saddle urges each slide toward the axis of the pipe length and the actual position of a tool mounted in the holder, relative to the rotating end of a pipe length, is determined by a roller on the slide engaging a guide bar on the frame.

A complete understanding of the invention may be obtained from the following detailed description and explanation which refer to the accompanying drawings illustrating the present preferred embodiment. In the drawings:

FIGURE 1 is a partial plan view;
FIGURE 2 is a section through the frame showing the saddle and associated parts in elevation;
FIGURE 3 is a section taken on the plane of line III—III of FIGURE 1, with parts in elevation; and
FIGURE 4 is a partial section taken on the plane of line IV—IV of FIGURE 1.

Referring now in detail to the drawings, the machine of my invention, which is symmetrical about the center line 10, comprises a supporting frame 11 on which are formed spaced parallel ways 12. A saddle 13 is slidable along said ways by a fluid-pressure cylinder and piston 14 mounted on the frame. The saddle is held on the ways by gibs 15. The center line of the machine is alined with the axis of a pipe length held in chucking and driving means (not shown) so that, when the saddle is advanced by cylinder 14, tools mounted thereon, as will be described later, engage the end of the pipe to turn a taper and cut a thread thereon.

The saddle 13, as shown in FIGURE 1, is elongated transversely of ways 12. It has dove-tailed ways 16 formed longitudinally thereon at one side and a pair of tool-holder slides 17 secured thereto by gibs 18. A fluid-pressure cylinder 19 for each slide is mounted on a shelf 20 extending laterally from the end of saddle 13 and has its piston rod 19a threaded into slide 17. The slide has spaced outboard webs 17a overhanging frame 11 and connected by a bridge web 17b below shelf 20. Movement of the slide toward center line 10 by cylinder 19 is limited by the engagement of a roller 21 journaled in a recess in web 17b, with a guide bar 22 mounted on the side of frame 11. The outer face of bar 22 is at an acute angle to ways 12. Thus, as saddle 13 is advanced, slide 17 is gradually retracted against the opposing pressure exerted by cylinder 19 to cause a tapered, threaded end to be formed on the pipe. Roller 21 and bar 22 may therefore be considered profile-determining means.

Slide 17 has a step or abutment 23 thereon and a tool holder 24 is positioned relative thereto by a precision spacer block 25. Holder 24 carries a tool-mounting block 26 (FIGURE 3) provided with taper-turning tools 26a and thread chasers 26b. The sides of holder 24 are recessed as shown at 24a and T-head clamping bolts 27 movable in slots 27a in slide 17, extend upwardly into the recesses, to secure the holder in position on the slide. The holder is adjustable along the slide, when the nuts on bolts 27 are backed off, by virtue of a tongue-and-groove formation of their engaging surfaces, indicated at 28. For adjustment of the tool holder on the slide, a pull-back screw shaft 29 extends from a thrust bearing 30 upstanding on the slide into a horizontal bore 31 in the holder. A vertical bore 32 in the holder intersects bore 31 and accommodates a nut post 33 having a tapped transverse hole therein through which shaft 29 is threaded. Post 33 is secured in bore 31 by a set screw 32a.

As previously stated, holder 24 is properly positioned on slide 17 by block 25. A special block is provided for each pipe size. To change blocks, shaft 29 is turned to advance the holder to permit block 25 to be removed. Thereafter, on substitution of a spacer block of the desired size, the shaft is turned back to pull the holder toward the bolck and clamp the latter firmly against step or abutment 23.

It will be evident from the foregoing that my improved threading machine has the advantage of an extremely rigid tool mounting which is substantially free from vibration even at high speeds of operation. Changes in the setting for pipe of different sizes is easily made by means of precision spacer blocks requiring no special skill on the part of the operator. The guide bars are located remote from the cutting and threading zone so they are not subject to falling chips and lubricant. As a result, the machine produces accurate threads at high speeds, with a greatly improved finish.

Although I have disclosed herein the preferred embodiment of my invention, I intend to cover as well any change or modification therein which may be made without departing from the spirit and scope of the invention.

I claim:

1. The combination with a saddle disposed with its length transversely of an elongated machine-tool frame and movable sidewise on ways extending longitudinally of the frame, of a tool-holder slide movable on said saddle toward and from the longitudinal central plane of the frame, a fluid-pressure motor mounted on the saddle effective to urge said slide toward said plane, cooperating profile-determining means on said slide and frame, respectively, limiting travel of the slide under the force of said motor, a tool holder adjustable on said slide longitudinally thereof, an abutment on said slide adjacent said holder, a removable spacer-block between said abutment and said holder and screw means on said slide engaging said holder, effective to retract it away from said plane against said block and the block against said abutment.

2. Apparatus as defined in claim 1, characterized by said slide having spaced webs overhanging one end of said saddle and a bridge web connecting them, said profile means being mounted on said bridge web.

3. Apparatus as defined in claim 1, characterized by said screw means including a threaded shaft and a nut post disposed in said holder transversely of said shaft, said post having a tapped hole therethrough into which said shaft is threaded.

References Cited in the file of this patent

UNITED STATES PATENTS

| | | |
|---|---|---|
| 1,297,194 | Lingren | Mar. 11, 1919 |
| 1,556,949 | Mall | Oct. 13, 1925 |
| 1,878,628 | Foster | Sept. 20, 1932 |
| 2,396,631 | Andresen | Mar. 19, 1946 |
| 2,831,387 | Ovshinsky | Apr. 22, 1958 |
| 3,066,330 | Howe et al. | Dec. 4, 1962 |

FOREIGN PATENTS

| | | |
|---|---|---|
| 613,765 | Germany | May 9, 1935 |